May 28, 1968    J. A. MULLINS    3,385,066
V.T.O.L. AIRCRAFT ROTATABLE POWER PLANT
Filed July 21, 1966    2 Sheets-Sheet 1

Inventor
John Abbert Mullins
By
Attorney

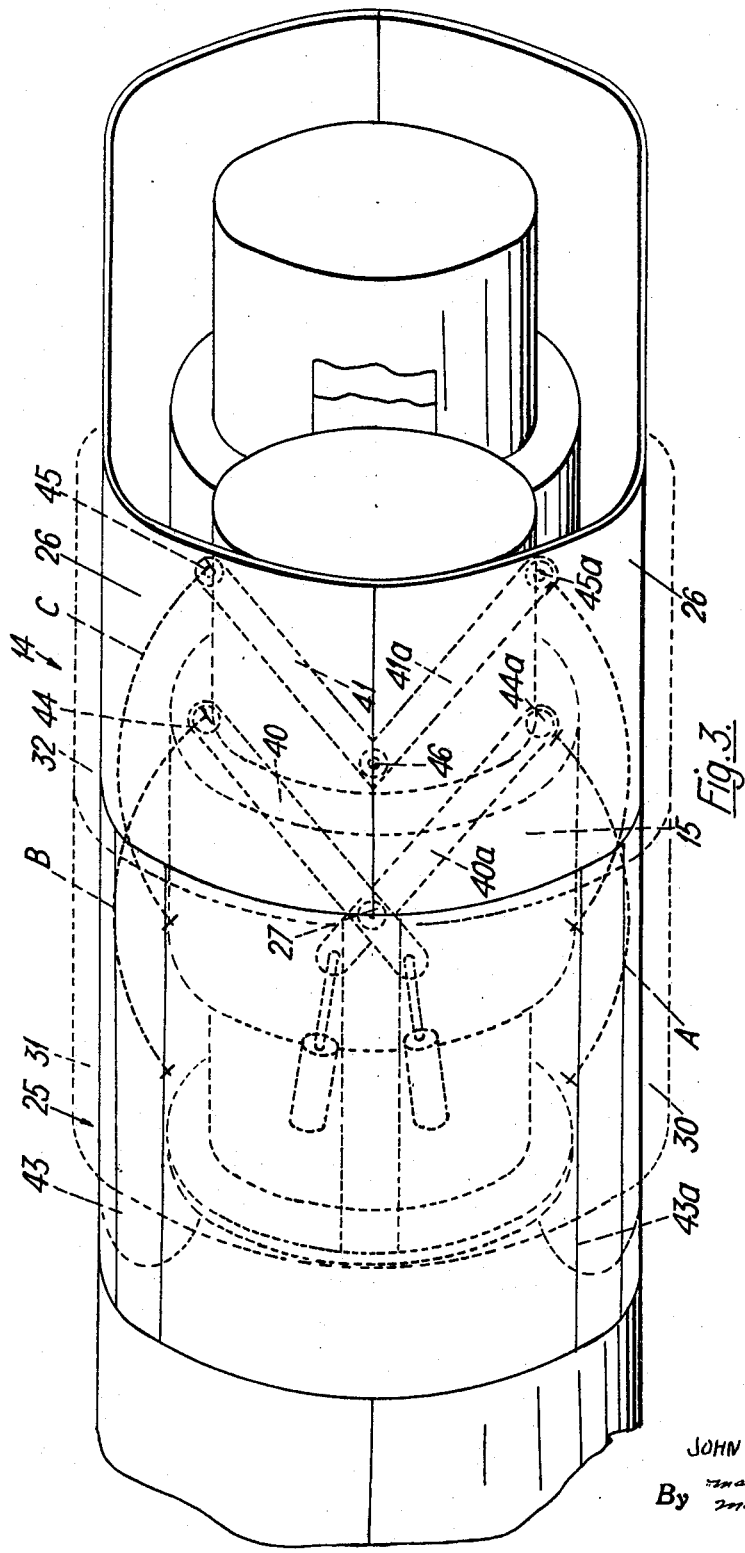

United States Patent Office 3,385,066
Patented May 28, 1968

3,385,066
V.T.O.L. AIRCRAFT ROTATABLE POWER PLANT
John Albert Mullins, Derby, England, assignor to Rolls-Royce Limited, Derby, England, a British company
Filed July 21, 1966, Ser. No. 566,836
Claims priority, application Great Britain, Aug. 6, 1965, 33,871/65
7 Claims. (Cl. 60—228)

ABSTRACT OF THE DISCLOSURE

The invention concerns aircraft power plant having a plurality of vertical lift jet engines mounted in a pod, the engines being normally disposed horizontally but being rotatable to a position in which their longitudinal axes are at an angle to the horizontal. Parts of the pod spacing the engines axially apart are slidable over the next adjacent engine when it is desired to effect rotation thereof.

---

This invention concerns aircraft power plant.

According to the present invention, there is provided aircraft power plant comprising a housing within which are mounted a plurality of vertical lift jet engines which are spaced from each other longitudinally of the housing, means for moving each engine between an inoperative position in which its longitudinal axis is horizontal and an operative position in which its longitudinal axis is at an angle to the horizontal, said housing having engine and spacer portions, each engine being secured to an engine portion of the said housing and being spaced from an adjacent engine by a spacer portion of the housing, the said engine and spacer portions being arranged contiguously when the engines are in their inoperative positions in which the housing is closed to prevent ambient air from entering it, and means for displacing the spacer portions to a location which allows the engines to be moved into their operative positions and in which the housing is open to permit ambient air to enter it after the spacer portions have been displaced.

The term "vertical lift engine" as used in this specification is intended to indicate an engine adapted to produce vertical lift forces on an aircraft independently of those generated aerodynamically by forward flight of the aircraft. Thus, the thrust to weight ratio of each said engine may be at least 8:1 and preferably is at least 16:1.

The or each spacer portion, when in the said location, is preferably disposed about and is carried by an axially adjacent engine portion. Thus, the or each spacer portion may be longitudinally split into at least two radially separable parts, means being provided for effecting radial separation of said parts and for moving said parts longitudinally to a position in which they are disposed about and carried by the said adjacent engine portion.

Preferably, the or each spacer portion, when disposed about the said adjacent engine portion, is radially spaced therefrom by a gap through which ambient air may enter the housing.

When the engines are in their operative positions, they may project to a substantial extent outwardly of the confines of the housing. Preferably, when the engines are in their operative positions, they can be moved to direct their thrust forwardly or rearwardly as required.

The said housing may, for example, be a pod.

The invention also comprises an aircraft provided with a power plant as set forth above.

The invention is illustrated, merely by way of example, in the accompanying drawings, in which:

FIGURE 3 is an elevation, with hidden parts shown in dotted lines.

Figure 1:
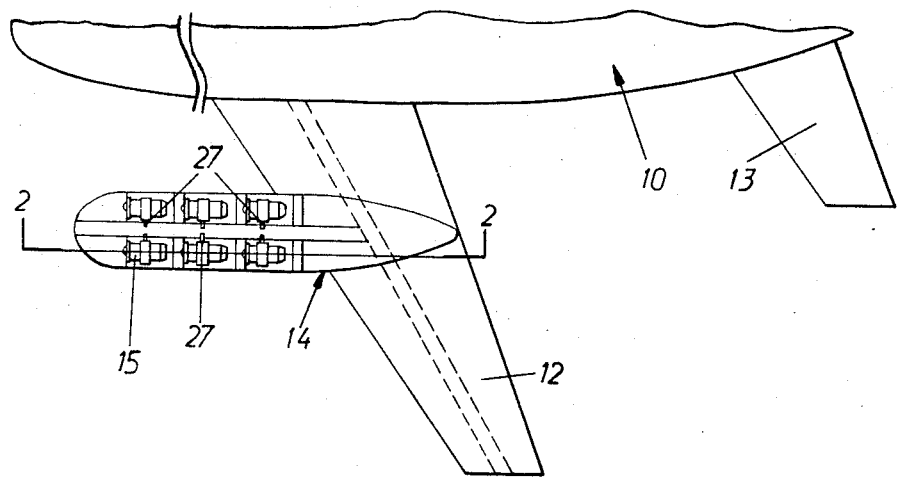
FIGURE 1 is a diagrammatic underneath plan view partly in section of an aircraft provided with an aircraft power plant according to the present invention.

In FIGURE 1 there is shown an aircraft 10 having a fuselage 11 and wings 12 (only one shown). The fuselage 11 has a tail plane 13 adjacent to which there are mounted forward propulsion gas turbine jet engines (not shown).

A pod 14 is mounted beneath each of the wings 12 and is connected thereto by a strut (not shown). Alternatively, the pod may be mounted in cantilever fashion from the leading edge of the respective wing 12.

Mounted in each of the pods 14 is a bank of six gas turbine vertical lift jet engines 15 which are arranged as three pairs of engines spaced longitudinally of the pod 14, the two engines of each said pair being arranged transversely of the pod 14. Each of the engines 15 has a thrust to weight ratio of at least 8:1 and preferably of at least 16:1.

Each of the engines 15 has an air intake 20, a compressor 21 which may be fabricated largely of synthetic resin materials, combustion equipment 22, a turbine 23, and a variable area nozzle 24.

Each pair of engines 15 which are arranged transversely of the pod 14 are mounted within and secured to an annular engine portion 25 of the pod 14 and are spaced from the axially adjacent pair of engines 15 by a spacer portion 26 of the pod 14, said pair of engines 15 being mounted on common trunnions 27 which connect said pair of engines to a central structure 18. Each said pair of engines 15, together with the engine portions 25 connected thereto, can be pivoted about the trunnions 27 so that they may be disposed as desired in inoperative and in operative positions.

Figure 2:
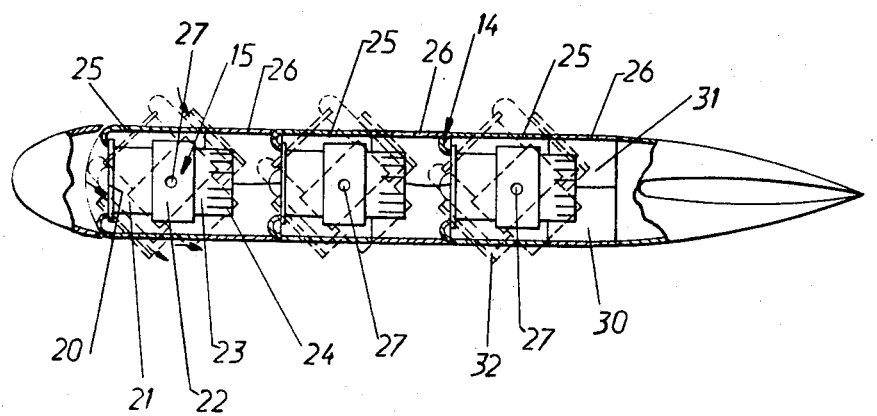
FIGURE 2 is a diagrammatic sectional view taken on the line 2—2 of FIGURE 1.

In the operative position, which is shown in FIGURE 2 in full lines, the engines 15 are disposed with their longitudinal axes horizontal, the engine portions 25 and spacer portions 26 being arranged contiguously so that the pod 14 is closed to prevent ambient air from entering it.

When, however, the engines 15 are in their operative positions, which are shown in FIGURE 2 in dotted lines, their longitudinal axes are at an angle (e.g. 90°) to the horizontal, and the engines 15 are then movable (by means not shown) to direct their thrust forwardly or rearwardly as required.

When, moreover, the engines 15 are in their operative positions, they project to a substantial extent above and below the confines adopted by the pod 14 when closed. The spacing between the engines 15 is, moreover, such that, when the latter are in their operative positions, they will not be starved of air by reason of any obstruction provided by any engines upstream of them.

The spacer portions 26 are split longitudinally into at least two radially separable parts 30, 31 and means described below with reference to FIGURE 3 are provided for effecting radial separation of the parts 30, 31 and for moving the parts 30, 31 longitudinally to a position in which said parts 30, 31 are disposed about and carried by the adjacent engine portions 25. When, however, the said radially separable parts 30, 31 are so disposed about the engine portions 25, they are radially spaced therefrom by a gap 32 through which ambient air may enter the pod 14.

Thus, after the spacer portions 26 have been so moved, the engines 15 can thereafter be moved into their operative positions in which the pod 14 is open to permit ambient air to enter it.

Since in the inoperative positions of the engines 15 air will not enter the pods 14, and since air may enter the spaces between the engines 15 when the latter are in their operative positions, base drag will be reduced.

While many convenient mechanical arrangements may be devised for effecting the above-described movement of the spacer portions 26, FIGURE 5 illustrates one embodiment of such an arrangement, by way of example.

As can be seen, the spacer portions 26 comprise lower and upper halves 30, 31 respectively (as seen on FIGURE 3). A pair of ram-actuated levers 40, 40a is provided to move, respectively, the upper and lower halves 31, 30 of the spacer portions 26 along the dotted lines B, A, respectively, thus moving said halves outwardly and rearwardly (to the left, as seen on FIGURE 3), there being a pivotal connection therebetween at 44, 44a. The rams are shown at 42 and they may be hydraulic or pneumatic rams mounted on fixed structure. As can be seen, the levers 40 pivot about the trunnions 27 on which the engines 15 are mounted.

A further pair of levers 41, 41a is provided, respectively, for supporting the upper and lower halves 31, 30 of the spacer portions 26. The levers 41, 41a may be pivoted at any convenient point, such as 46, on one of the engines 15 and they will move solely by virtue of their connection to the spacer portions at 45, 45a along the arcuate path shown at C.

A pair of hinged flaps 43, 43a is provided through which the levers 40, 40a and 41, 41a will project when the spacer portions 26 have been moved to their position corresponding to the operative position of the engines 15, shown in dotted lines on FIGURE 2.

I claim:

1. Aircraft power plant comprising a housing, a plurality of vertical lift jet engines which are mounted in said housing and spaced from each other longitudinally of the housing, means for moving each engine between an inoperative position in which its longitudinal axis is horizontal and an operative position in which its longitudinal axis is at an angle to the horizontal, said housing having engine and spacer portions, each engine being secured to an engine portion of the said housing and being spaced from an adjacent engine by a spacer portion of the housing, the said engine and spacer portions being arranged contiguously when the engines are in their inoperative positions in which the housing is closed to prevent ambient air from entering it, and means for the spacer displacing portions to a location which allows the engines to be moved into their operative positions and in which the housing is open to permit ambient air to enter it after the spacer portions have been displaced.

2. Aircraft power plant as claimed in claim 1 in which the spacer portion, when in the said location, is disposed about and is carried by an axially adjacent engine portion.

3. Aircraft power plant as claimed in claim 2 in which the spacer portion is longitudinally split into at least two radially separable parts, means being provided for effecting radial separation of said parts and for moving said parts longitudinally to a position in which they are disposed about and carried by the said adjacent engine portion.

4. Aircraft power plant as claimed in claim 2 in which the spacer portion, when disposed about the said adjacent engine portion, is radially spaced therefrom by a gap through which ambient air may enter the housing.

5. Aircraft power plant as claimed in claim 1 in which, when the engines are in their operative positions, they project to a substantial extent outwardly of the confines of the housing.

6. Aircraft power plant as claimed in claim 1 in which, when the engines are in their operative positions, they can be moved to direct their thrust forwardly and rearwardly as required.

7. Aircraft power plant as claimed in claim 1 in which the said housing is a pod.

References Cited

UNITED STATES PATENTS 3,297,279  1/1967  Wilde, et al.
3,311,327  3/1967  Greulich.

FOREIGN PATENTS 993,731  6/1965  Great Britain.

CARLTON R. CROYLE, *Primary Examiner.*